United States Patent [19]

Hallerback et al.

[11] 4,240,777
[45] Dec. 23, 1980

[54] FEEDING AND MIXING NOZZLE AND METHOD FOR MIXING LIQUID RESIN MIXTURES AND FEEDING IT INTO MOLDS BY CENTRIFUGAL FORCE

[75] Inventors: Stig L. Hallerback, Vastra Frolunda; Leif Lachonius, Surte, both of Sweden

[73] Assignee: Aktiebolaget SKF, Goteborg, Sweden

[21] Appl. No.: 13,081

[22] Filed: Feb. 21, 1979

Related U.S. Application Data

[62] Division of Ser. No. 798,647, May 19, 1977, Pat. No. 4,162,039.

[30] Foreign Application Priority Data

Jul. 5, 1976 [SE] Sweden .................................. 7607647

[51] Int. Cl.³ ............................................. B29C 5/04
[52] U.S. Cl. ...................... 425/130; 264/311; 264/349; 425/200; 425/434; 425/449
[58] Field of Search ................ 264/311, 349; 425/130, 425/200, 434, 449

[56] References Cited

U.S. PATENT DOCUMENTS

| | | | |
|---|---|---|---|
| 3,683,973 | 8/1972 | Hatcher | 141/283 X |
| 3,742,109 | 6/1973 | Zijp | 264/311 |
| 4,094,624 | 6/1978 | Holm | 264/311 X |
| 4,098,861 | 7/1978 | Bassani | 264/240 X |
| 4,162,039 | 6/1979 | Hallerback | 425/434 |

Primary Examiner—Thomas P. Pavelko
Attorney, Agent, or Firm—Eugene E. Renz, Jr.

[57] ABSTRACT

A nozzle for dosing, feeding and if necessary mixing substances, comprising a rotatable vessel of cup-like form having a base, a central hub portion and an outer wall spaced radially outwardly from the hub portion. The outer wall defines a pouring opening in its upper portion and has a plurality of outlet openings disposed at its lower portion. The vessel is rotatable about a central vertically disposed axis through the hub portion. A plurality of equiangularly spaced partition walls extending between the hub portion and outer wall divides the nozzle into a plurality of chambers. An outlet opening is provided in each of the chambers; and a receiving mold at each outlet rotatable with nozzle receives the molding material by centrifugal force. A stationary supply tube means discharging into the pouring opening of the nozzle combined with rotation of the nozzle at a predetermined uniform rate ensures that substantially equal quantities of the molding material are dispensed to each of the molds located adjacent the outlet openings in the nozzle.

11 Claims, 8 Drawing Figures

FEEDING AND MIXING NOZZLE AND METHOD FOR MIXING LIQUID RESIN MIXTURES AND FEEDING IT INTO MOLDS BY CENTRIFUGAL FORCE

This is a division of our prior application Ser. No. 798,647 entitled A FEEDING AND MIXING NOZZLE filed May 19, 1977 now U.S. Pat. No. 4,162,039 issued 7-24-79.

BACKGROUND OF THE INVENTION

The present invention relates to feeding and mixing nozzles primarily intended for mixing liquid resin mixtures and feeding them into molds by means of centrifugal force. The present invention relates to the nozzle construction per se and also to a method of mixing and feeding liquid resin mixtures to a plurality of molds in a simple and effective manner ensuring filling of the molds with substantially equal volumes or quantities of the material.

When molding curable resin mixtures, for example, there are essentially two factors or problems to consider, that is first, a correct dosing of the volume of the molding mixture and second, the ability to complete the mixture in as short a time as possible prior to the feeding in order to avoid curing which causes blockage of the nozzle and feed channels. Swedish Pat. No. 370,351 attempts to solve this problem. This Patent shows a mixing vessel having a bottom opening and a rather complicated and sophisticated rotating mixing device inside the vessel. While this arrangement alleviates to some extent the blockage problem, it is nevertheless extremely complicated and is devoid of any means for dosing and distributing the resin mixture.

The purpose of the present invention is to solve the two main problems noted above and to provide a nozzle and method which does as well as mixes the molding mixture in a manner whereby predetermined, substantially uniform, well-measured volumes of molding mixture are fed, after being well stirred or mixed into a plurality of molds simultaneously. The mixing is achieved at the latest possible stage and therefore blockage or plugging up of the nozzle is avoided.

SUMMARY OF THE INVENTION

In accordance with the present invention there is provided a nozzle for dosing, feeding and if necessary mixing liquid and/or solid components which is characterized by novel features of construction and arrangement including a rotatable vessel having a pouring opening in its upper portion and outlet openings arranged preferably in its lower portion and means subdividing the vessel into a plurality of chambers each having its own outlet opening. The vessel is divided into chambers by means of vertical partition walls which are in a preferred form of the invention arranged radially and spaced apart a uniform or equal angular distance. In this manner, molding mixture may be dispensed into the vessel from a stationary source and upon rotation of the vessel at a uniform angular rate, substantially equal quantities of the mixture are dispensed to molds located adjacent the outlet openings. This is particularly advantageous in mass production techniques to mold identical products of substantially the same volume and which are essentially identical.

In accordance with another feature of the invention, the lower portion of the vessel is tapered and the outlet openings are arranged at the upper portion of the taper. Still another feature of the present invention is the provision of intermediate walls disposed in the path of the pouring jet to achieve a good mixing of the components. It is essential that these intermediate walls are all of the same height.

The rotatable vessel is preferably open at its top so that the pouring opening is formed by the upper horizontal surface of the vessel. The components introduced into the vessel then flow through supply tubes directly into the vessel. In the case of plural supply tubes they are preferably arranged side by side.

Auxiliary means may be employed in addition to the intermediate walls to achieve a good stirring action of the components. Such auxiliary means can comprise nets, labyrinthian walls or other equivalent arrangements in each chamber.

The molds for receiving the molding mixture may be arranged on a rotating disc and in accordance with one embodiment of the invention, the nozzle is attached to this disc and is supported for rotation therewith. In accordance with another embodiment of the illustrated invention, the nozzle may be arranged separately from the device which shall receive the components and it may be supported in a manner so that it is rotated by means of the rotatable device when it is brought into engagement with the nozzle.

The present invention also contemplates three or more components for the molding mixture and in the event that it is unsuitable to mix them simultaneously, it is possible according to the present invention to connect two nozzles in series by arranging them concentric and thereupon feeding the two nozzle portions with different components of the mixture.

DESCRIPTION OF THE DRAWINGS

These and other objects of the present invention and the various features and details of the operation and construction thereof are hereinafter more fully set forth with reference to the accompanying drawings, wherein.

DESCRIPTION OF PREFERRED EMBODIMENTS

Figure 1:
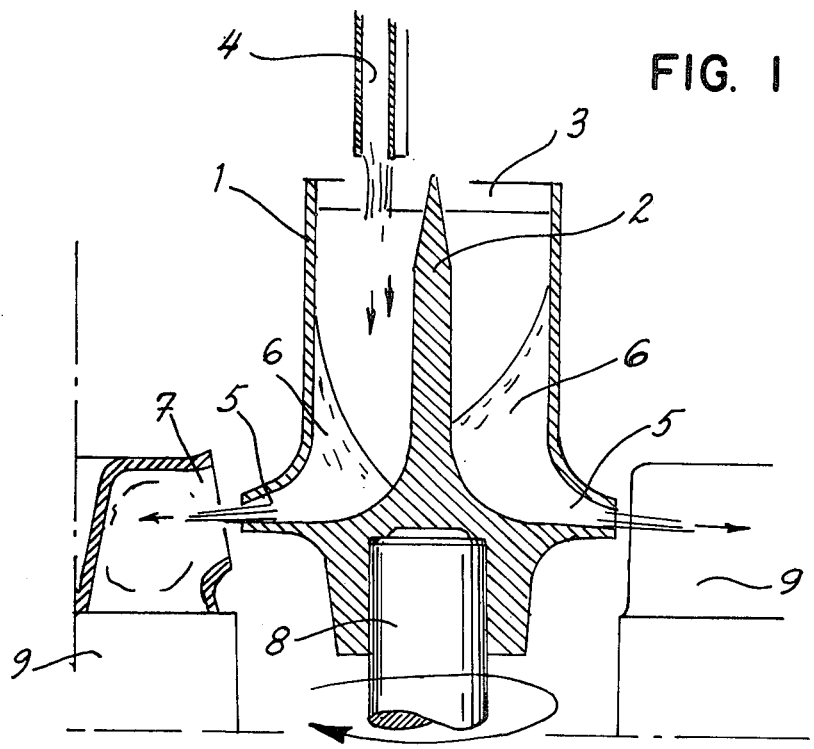
FIG. 1 shows in a vertical section a nozzle according to the invention.

Referring now to the drawings and particularly FIG. 1 thereof, there is shown a mixing and feeding nozzle 1 constructed in accordance with the present invention. As illustrated, the nozzle is a generally cylindrical vessel having a central axis 2. The inlet or pouring opening 3 of the nozzle is formed by the open upper end portion thereof. A stationary supply tube 4 is disposed eccentrically relative to the central axis 2 whereby open rotation of the nozzle at a constant or uniform angular rate equal quantities of the molding mixture are supplied to each of the chambers. The nozzle 1 is provided with outlet openings for the mixed molding mixture 6. As illustrated the molding mixture flows freely into the opening 7 of the receiving molds 7a, which in the present instance forms a stator for an electric machine. A nozzle 1 is arranged on a trunnion 8 and rotates together with the molds 9 and in this fashion the molding mixture 6 is dispensed into the molds by centrifugal force.

Figure 2:
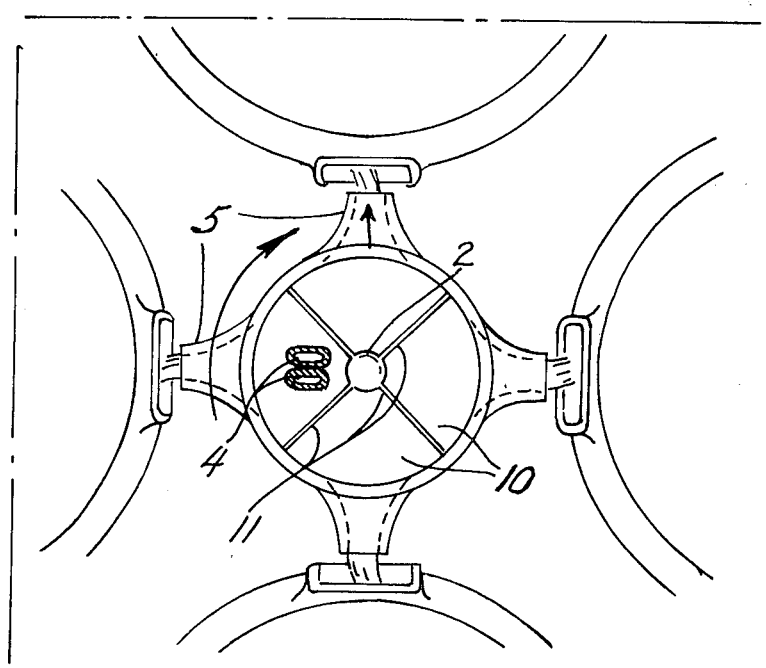
FIG. 2 shows the same nozzle as seen from above.

FIG. 2 best illustrates the chambers 10 formed in the nozzle by means of vertical partition walls 11. As noted above, since the stationary supply tubes 4 are arranged eccentrically to the axis 2, all of the chambers will be fed with an equal volume of the molding mixture since the walls 11 are equi-angularly spaced or are at the same mutual angular distance relative to one another. Accordingly, upon a certain volume of mixture being metered into the nozzle, the amount of molding mixture dispensed into, in the present instance, the four stator molds is in exactly equal volumes independent of the size of the chambers, the tube or the outlet opening 5. These outlet openings have a tendency to become plugged due to the fact that the resin is curing and it is thus difficult to maintain the openings a constant size and thereby provide a constant flow rate through all four openings. In accordance with the present invention if a certain amount of clogging does take place, resulting in the outlet openings varying in size from one another, the amount of molding mixture dispensed to each of the molds is nevertheless the same and only the time for each chamber to expel its contents will be different if the outlet openings are not exactly alike.

The liquids in the stationary feed or supply tubes 4 can for instance be an epoxy resin in one of the tubes and a hardener in the other. Upon rotation of the nozzle, when a partition wall passes the jets of liquid, they will impinge against the partition wall and become stirred or mixed. Passage through the outlet opening results in a further stirring action and this mixing can be improved by means of a variety of auxiliary means such as nets, intermediate walls and the like which impose turbulence to the liquid flow. It has been found that optimum mixing of the liquids will take place if the supply tubes 4 are arranged side by side and if the flow of liquid from the tubes is impinging against the partition walls at the same time. It is, however, to be understood that the supply tubes 4 also can be arranged separately and that the invention is not limited to a given number of supply tubes. For liquids comprising molding mixtures which are hard to mix, it may be advantageous to dispense the liquids into the chambers through a larger number of tubes.

FIG. 2 shows a nozzle having four chambers which as noted above provides an equal volume of mixed liquid to the molds associated with each of the chambers. The liquid volumes are equal due to the fact that the angular distance between the partition walls is equal. In some instances liquid flow can be divided to provide different volumetric relationships simply by changing the angular distance between the partition walls.

Figure 3:
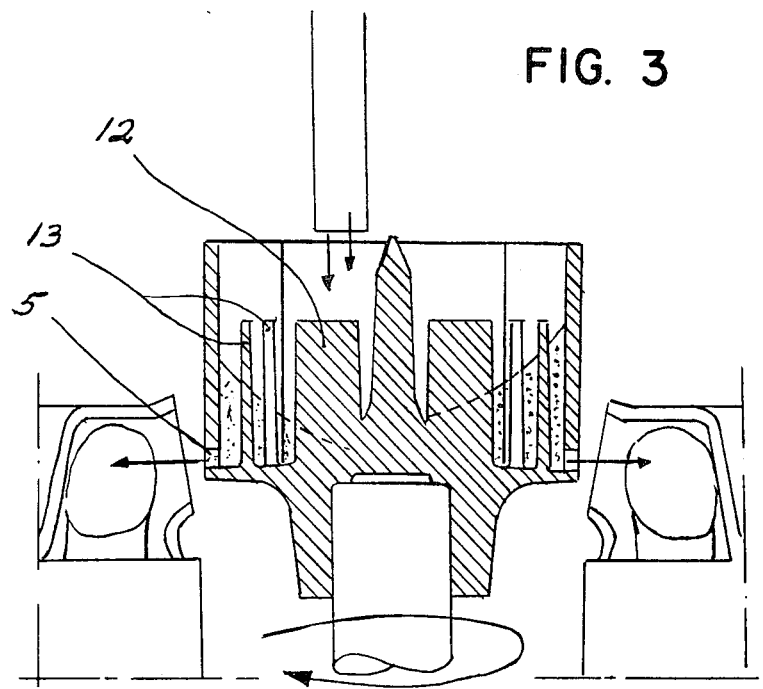
FIG. 3 shows a second embodiment of a nozzle according to FIG. 1.
Figure 4:
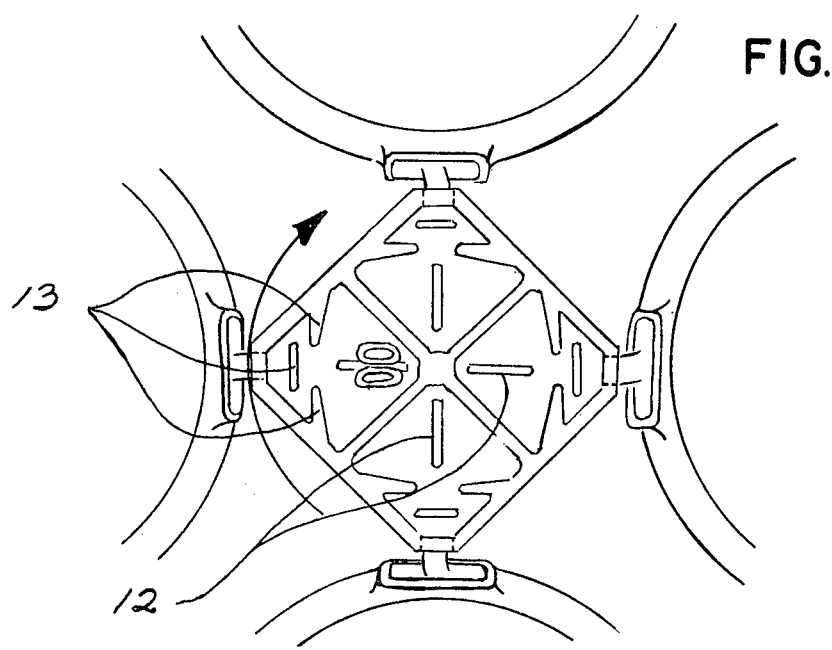
FIG. 4 shows the nozzle according to FIG. 3 as seen from above.

There is illustrated in FIGS. 3 and 4 another embodiment of nozzle in accordance with the present invention. In accordance with this embodiment, the vessel forming the nozzle is generally square and has intermediate walls 12 and labyrinth walls 13. In the present instance, the outlet openings 5 are formed by holes drilled in the walls of the vessel 1. This arrangement provides a more efficient disintegration of the liquid jet and the mixed liquid traverses a longer path to the outlet openings by reason of the labyrinthian walls 13.

Figure 5:
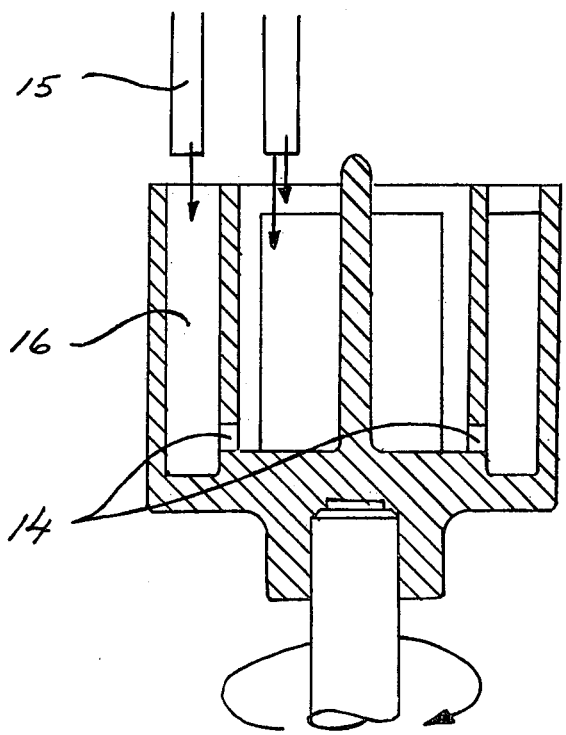
FIG. 5 is a vertical section through a nozzle in which three or more liquid flows shall be mixed but not at the same time.
Figure 6:
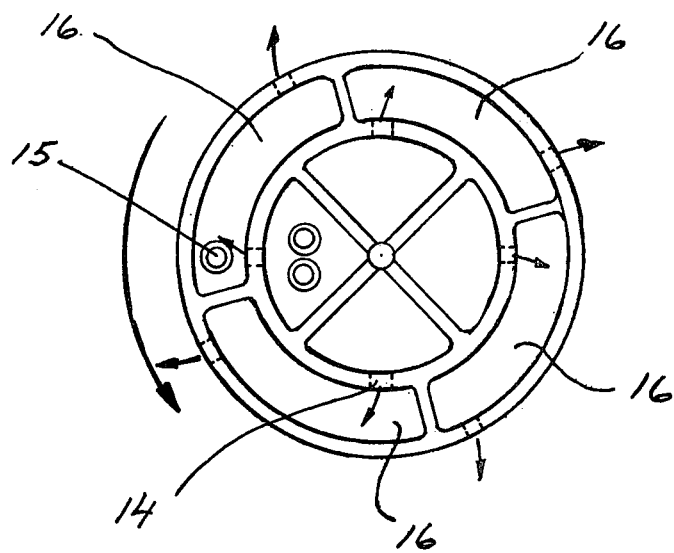
FIG. 6 shows the nozzle according to FIG. 5 as seen from above.

There is illustrated in FIGS. 5 and 6 a feeding and mixing nozzle for use with three liquids that are not mixed simultaneously. As illustrated two mixing vessels are arranged concentric, one inside the other and outlet openings 14 are provided in the lower portion of the inner vessel to provide communication between the inner chambers and the chambers between the inner vessel and the outer vessel. By this arrangement, two of the liquids are premixed in the inner chambers and then flow to the outer chambers where another supply tube 15 discharges a third liquid to be mixed in the chamber 16 with th premixed liquid from the inner chambers. Outlet openings are provided in the lower portion of the outer peripheral wall which as in the previously described embodiments discharge into molds. Liquids which are preferably mixed in this manner can, for example, comprise a plastic material, a hardener and an accelerator for the hardener. In this instance, it is essential that the accelerator does not come in contact with the hardener prematurely since there is the danger of an explosion-like reaction occurring.

Figure 7:
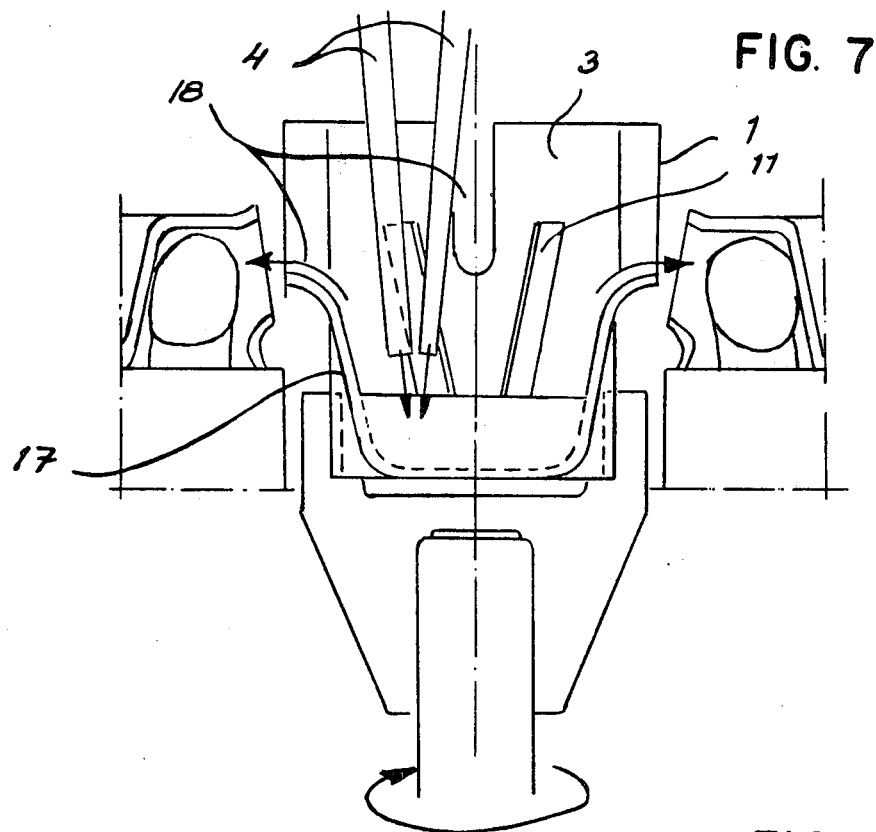
FIG. 7 shows in a vertical section a further embodiment of the nozzle according to the invention.
Figure 8:
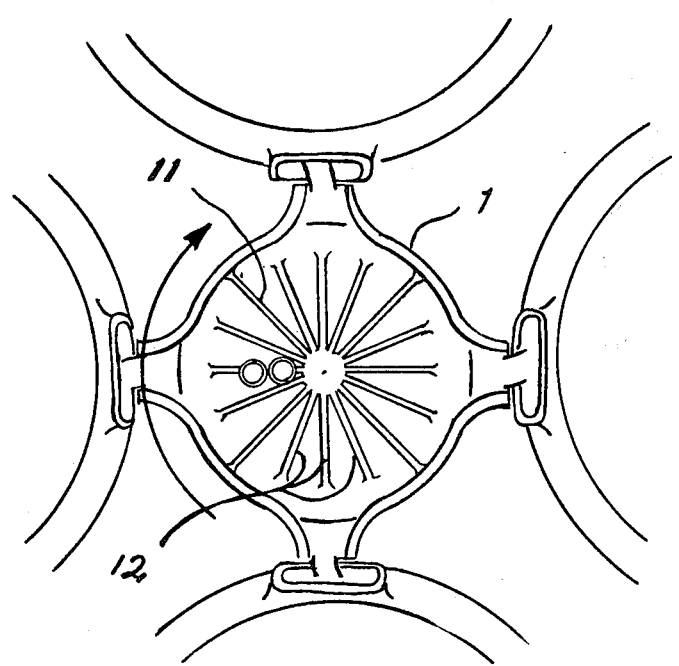
FIG. 8 shows the nozzle according to FIG. 7 as seen from above.

A further embodiment of a feeding and mixing nozzle in accordance with the present invention is illustrated in FIGS. 7 and 8. The main difference between this embodiment and those previously described is that the lower portion 17 of the vessel is downwardly convergent. By this arrangement, during rotation, the molding mixture moves by centrifugal force upwards along the tapered inner wall and is dispensed from the vessel through the outlet openings 18 which in this case are formed as slots extending downwardly from the upper peripheral edge of the vessel. As illustrated a plurality of intermediate walls 12 are disposed between the main partition walls 11 for the purpose of disintegrating the jet of liquid from the supply tubes. It has been found that it is essential for good mixing of the components that all of these intermediate walls 12 are of substantially same height. The partition walls 11 which are equiangularly spaced divide the volume of liquid into substantially equal volumetric portions and these walls therefore must extend somewhat higher than the bottom of the slots 18. An advantage of this nozzle construction is that it can be made by projection molding in a two-piece mold at very low manufacturing costs.

The molds for the members to be molded, for electric motors which receive the volume of molding mixture are preferably attached to a rotatable disc provided with a pouring opening facing the center of the disc. The mixing and feeding nozzle in this instance can be firmly mounted on the disc and located at its center. Since the chambers must be emptied in a very short period of time; that is, before the molding mixture has begun to gel appreciably, it is not necessary to clean the nozzle.

It is, however, possible that the nozzle is instead mounted separately from the rotating disc and above it. In this arrangement the disc is raised to engage the nozzle and to rotate the same. An advantage of this arrangement is that the same nozzle can be used for serving several sets of stators on different discs. It is necessary that the disc must rotate during a period of time after the pouring is completed until the plastic mixture has been sufficiently cured. It is thereby possible to use only one nozzle for pouring a plurality of disc sets.

As has been described above and as illustrated in the drawings, the mixed resin flows directly into the molds without being transferred via tubes or the like. In this manner all problems relating to plugging of supply tubes are avoided. This also obviates the task of removing the pouring ingate.

The feeding nozzle of present invention may be manufactured from a plastic material or from other inexpensive materials which can be made at a very economical cost. In this manner after a period of use, if it is necessary to clean the nozzle, it may be simply removed and discarded. Other problems such as environmental problems which are significant and expensive and are inherent in prior apparatus which require cleaning, are avoided.

Even though various embodiments of the invention have been illustrated and described herein, it is not intended to limit the invention and changes and modifications may be made therein within the scope of the following claims.

What is claimed is:

1. A method for dosing, feeding and mixing at least two substances consisting of the steps of rotating a vessel having a plurality of equiangularly spaced partition walls providing a plurality of chambers therein about its central axis at a predetermined uniform angular rate of rotation, the vessel being open at its upper end defining an inlet opening and having a plurality of outlet openings communicating with its chamber, discharging materials to be mixed at a predetermined uniform constant feed rate into the vessel from a location disposed eccentrically to the rotational axis thereof and disposing a plurality of molds to be filled adjacent the discharge openings whereby upon rotation of the vessel and molds, substantially equal quantities of the mixing material are dispensed to each of the molds.

2. An apparatus for dosing, feeding and mixing at least two substances comprising a vessel rotating about a hub defining a central axis having an inlet opening and a plurality of outlet openings, means for rotating said vessel about said central axis at a predetermined uniform angular rate, at least two supply tubes for discharging substances at a predetermined uniform rate into said vessel through the inlet opening disposed eccentrically to said central axis, said vessel being divided into a plurality of chambers, an outlet opening communicating with each of said chambers, said nozzles discharging sequentially into said chambers substantially equal quantities of said substances for a given angular rotation of said vessel, and a receiving mold at each outlet rotatable with said nozzle to receive the molding material by centrifugal force.

3. Apparatus as claimed in claim 2 wherein the supply tubes for the substances are arranged side by side.

4. A nozzle for dosing, feeding and if necessary mixing substances, comprising a rotatable vessel of cup-like form having a base, a central hub portion and an outer wall spaced radially outwardly from the hub portion, said wall defining a pouring opening in its upper portion and a plurality of outlet openings disposed at its lower portion, means for rotating said vessel about a central vertically disposed axis through the hub portion at a predetermined uniform angular rate, a plurality of equiangularly spaced partition walls extending between said hub portion and outer wall dividing said nozzle into a plurality of chambers, feed means located eccentrically to the axis of said hub portion for discharging materials at a predetermined uniform rate to said chambers, an outlet opening in each of said chambers, and a receiving mold at each outlet rotatable with said nozzle to receive the molding material by centrifugal force.

5. A nozzle as claimed in claim 4 wherein said partition walls are vertically oriented.

6. A nozzle as claimed in claim 4 wherein the outer first peripheral wall tapers and the outlet openings are arranged at the upper portion of the taper.

7. A nozzle as claimed in claim 4 including a plurality of walls in the vessel defining a labyrinthine path for the substances operable to improve the mixing effect.

8. A nozzle as claimed in claim 4 wherein each chamber is provided with intermediate walls disposed between the hub portion and outer first peripheral wall operable to disperse material entering the chambers.

9. A nozzle as claimed in claim 8 wherein the intermediate walls are all of the same height.

10. A nozzle as claimed in claim 4 including a rotatable disc upon which molds receiving the substances are mounted.

11. A nozzle as claimed in claim 10 including means for separately rotating the vessel so that the rotatable discs for receiving the substances is brought to engagement with the nozzle.

* * * * *